United States Patent
Davidson

(10) Patent No.: US 8,001,714 B2
(45) Date of Patent: Aug. 23, 2011

(54) BALLISTICS SYSTEMS AND METHODS

(76) Inventor: Aaron Davidson, Otto, WY (US)

(*) Notice: Subject to any disclaimer, the term of this patent is extended or adjusted under 35 U.S.C. 154(b) by 661 days.

(21) Appl. No.: 11/838,183

(22) Filed: Aug. 13, 2007

(65) Prior Publication Data

US 2008/0202198 A1 Aug. 28, 2008

Related U.S. Application Data

(60) Provisional application No. 60/822,289, filed on Aug. 14, 2006.

(51) Int. Cl.
*F41G 1/473* (2006.01)

(52) U.S. Cl. ........................................ 42/122

(58) Field of Classification Search .............. 42/122, 42/126

See application file for complete search history.

(56) References Cited

U.S. PATENT DOCUMENTS

| | | | | |
|---|---|---|---|---|
| 2,583,042 | A | * | 1/1952 | Dayton ........................... 42/122 |
| 2,715,275 | A | * | 8/1955 | Kipp ............................... 42/126 |
| 3,904,279 | A | * | 9/1975 | Sanada ........................... 359/827 |
| 3,990,155 | A | * | 11/1976 | Akin et al. ...................... 42/122 |
| 4,285,137 | A | * | 8/1981 | Jennie ............................. 42/122 |
| 4,561,204 | A | * | 12/1985 | Binion ............................ 42/122 |
| 5,375,072 | A | | 12/1994 | Cohen |
| 5,691,808 | A | | 11/1997 | Nourrcier, Jr. et al. |
| 5,824,942 | A | | 10/1998 | Mladjan et al. |
| 5,831,718 | A | | 11/1998 | Desai et al. |
| D442,252 | S | | 5/2001 | Kenton |
| 6,269,581 | B1 | | 8/2001 | Groh |
| 6,516,699 | B2 | | 2/2003 | Sammut et al. |
| 6,591,537 | B2 | | 7/2003 | Smith |
| 6,862,084 | B2 | | 3/2005 | Nagata et al. |
| 6,862,832 | B2 | | 3/2005 | Barrett |
| 6,873,406 | B1 | | 3/2005 | Hines et al. |
| D536,762 | S | | 2/2007 | Timm et al. |
| 7,239,377 | B2 | | 7/2007 | Vermillion et al. |
| 7,654,029 | B2 | | 2/2010 | Peters et al. |
| 2003/0145505 | A1 | * | 8/2003 | Kenton ........................... 42/135 |
| 2004/0020099 | A1 | | 2/2004 | Osborn, II |
| 2005/0229468 | A1 | | 10/2005 | Zaderey et al. |
| 2005/0257414 | A1 | | 11/2005 | Zaderey et al. |
| 2006/0010760 | A1 | | 1/2006 | Perkins et al. |
| 2006/0048432 | A1 | | 3/2006 | Staley, III |
| 2006/0236586 | A1 | | 10/2006 | Zaderey |
| 2006/0260171 | A1 | | 11/2006 | Cole et al. |
| 2007/0044364 | A1 | | 3/2007 | Sammut et al. |
| 2007/0097351 | A1 | | 5/2007 | York et al. |
| 2007/0137088 | A1 | | 6/2007 | Peters et al. |

OTHER PUBLICATIONS

Cheytac® Intervention™: Cheytac Long Range Rifle System, Intervention™ Tactical System; Dated Nov. 13, 2006; 25 pages. Optical Ranging System (BORS) Operator's Manual; Dated Feb. 1, 2007; 32 pages.
International Search Report and Written Opinion from PCT/US2007/075915, dated Jul. 16, 2008, 9 pages.
5-20 LR Owner's Manual, Huskeman Long Range Optics, undated.
Huskeman Optics Owners Manual, undated.

* cited by examiner

*Primary Examiner* — Stephen M Johnson
(74) *Attorney, Agent, or Firm* — Maschoff Gilmore & Israelson

(57) ABSTRACT

A scope may include an adjustment dial, which may be moved among a plurality of positions to configure the scope to compensate for projectile drops. The adjustment dial may be labeled with dial-calibration data, which may include one or more distance indicators and/or one or more windage hold-off indicators. The scope may be attached to a gun and the dial-calibration data may be at least partially generated using ballistics performance data based on shots fired by the gun. The dial-calibration data may be at least partially generated using shooting conditions. An electronic device may include a derived distance calculation module, which may be configured to use a distance to a target and actual shooting conditions to calculate a derived distance. The derived distance may be used in connection with an adjustment dial labeled with dial-calibration data at least partially generated using shooting conditions different from the actual shooting conditions.

19 Claims, 14 Drawing Sheets

BALLISTICS SYSTEMS AND METHODS

CROSS-REFERENCE TO RELATED APPLICATIONS

This application claims priority and the benefit of U.S. provisional patent application 60/822,289, which was filed Aug. 14, 2006 and entitled RAPID FIELD BALLISTIC COMPENSATOR AND METHOD OF PROVIDING THE SAME, the disclosure of which is incorporated by reference in its entirety.

BACKGROUND OF THE INVENTION

1. Field of the Invention

The present application relates generally to ballistics, guns and scopes.

2. Description of Related Art

Hunting and target shooting are very popular activities. Because accurately aiming guns may become more difficult as the distance to a target increases, scopes are often used in connection with guns. Generally, a scope may be connected to a gun and a shooter may look through the scope to view and aim at a target. But, even when using a scope, shooters may find it difficult and/or time consuming to accurately aim at a target.

BRIEF SUMMARY OF EMBODIMENTS OF THE INVENTION

A need therefore exists for systems and/or methods that eliminate or diminish the disadvantages and problems described above.

One aspect is a scope that may include an adjustment dial, which may be moved among a plurality of positions to configure the scope to compensate for projectile drops. The adjustment dial may be labeled with dial-calibration data, which may include one or more distance indicators. In particular, the adjustment dial may be sized and configured to move among a plurality of positions to configure the scope to compensate for projectile drops associated with a range of distances to a target, and the distance indicators may be configured to indicate at least some of the distances within the range. Desirably, the distance indicators may allow a shooter to quickly select a distance to a target to configure the scope to compensate for a projectile drop associated with the selected distance.

Another aspect is a scope that may include an adjustment dial that may be labeled with dial-calibration data, which may include one or more distance indicators and/or one or more windage hold-off indicators. The windage hold-off indicators may be configured to indicate a hold-off to compensate for an amount of deflection caused by a crosswind. To configure the scope to compensate for a projectile drop associated with a particular distance to a target, the shooter may move the adjustment dial to select the distance to the target. After the adjustment dial has been moved to select the distance to the target, a reference mark's position relative to various windage hold-off indicators may advantageously allow the shooter to quickly identify a hold-off tailored to the selected distance. The shooter may then apply the hold-off and fire the gun at the target.

A further aspect is a scope that may include an adjustment dial that may be labeled with dial-calibration data, which may be at least partially generated using one or more of the following factors: sight-height data, muzzle velocity data, dial specification data, ballistics coefficient data, ballistics performance data, projectile-form-factor data, projectile caliber, projectile weight, air-density factors (such as, pressure data, temperature data, elevation data, humidity data and/or other air-density factors) and wind data. Significantly, using one or more of these factors may allow more accurate dial-calibration data to be generated—thus facilitating more accurate shooting with the scope. Of course, these factors are not required and other factors may be used to generate the dial-calibration data.

Yet another aspect is a scope that may include an adjustment dial, which may be used in connection with a plurality of interchangeable components, such as turrets or other components. The components may be labeled with different dial-calibration data and may be sized and configured to be connected to and disconnected from a portion of the adjustment dial. For example, a first component may be labeled with first dial-calibration data that is at least partially generated using one set of shooting conditions, while a second component may be labeled with second dial-calibration data that is at least partially generated using a different set of shooting conditions. This may advantageously allow the adjustment dial to be used with different dial-calibration data tailored to the shooting conditions under which the scope is being used. If desired, the first and second dial calibration data may be at least partially generated based on one or more shots fired by a gun attached to the scope, which may further tailor the dial-calibration data to the gun.

Still another aspect is a system that may include an electronic device, which may include a derived distance calculation module. The derived distance calculation module may be configured to use a distance to a target and actual shooting conditions to calculate a derived distance. The derived distance may be used in connection with a scope's adjustment dial labeled with dial-calibration data that was at least partially generated using shooting conditions different from the actual shooting conditions. Desirably, this may allow a shooter to accurately aim at a target under shooting conditions that are different from those used to generate the dial-calibration data, which may increase the scope's flexibility.

These and other aspects, features and advantages of the present invention will become more fully apparent from the following detailed description of preferred embodiments and appended claims.

BRIEF DESCRIPTION OF THE DRAWINGS

The appended drawings contain figures of preferred embodiments to further illustrate and clarify the above and other aspects, advantages and features of the present invention. It will be appreciated that these drawings depict only preferred embodiments of the invention and are not intended to limit its scope. The invention will be described and explained with additional specificity and detail through the use of the accompanying drawings in which.

DETAILED DESCRIPTION OF THE PREFERRED EMBODIMENTS

The present invention is generally directed towards ballistics systems and methods. The principles of the present invention, however, are not limited to ballistics systems and methods. It will be understood that, in light of the present disclosure, the ballistics systems and methods disclosed herein can be successfully used in connection with other types of systems and methods. A detailed description of the ballistics systems and methods now follows.

Figure 1:
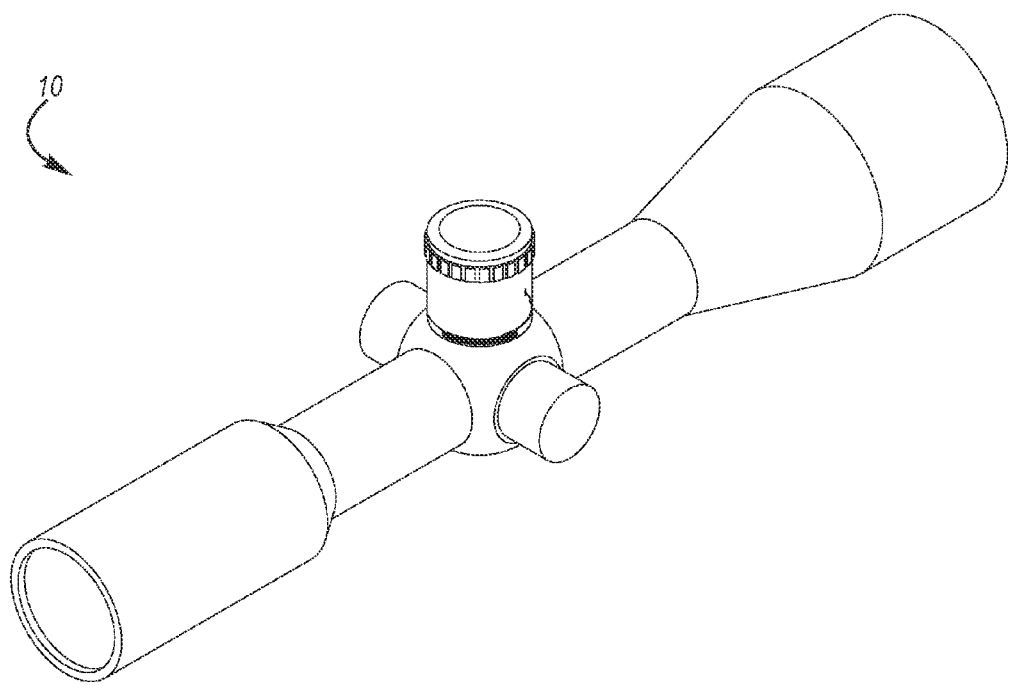
FIG. 1 is a perspective view of an exemplary scope.

A scope 10 shown in FIG. 1 may be used to aim a gun, such as a rifle, revolver or other gun. In particular, the scope 10 may be sized and configured to be connected to the gun and a shooter may look through the scope to view and aim at a target. The scope 10 preferably comprises a rifle scope sized and configured to be connected to a rifle; however, the scope may be any other suitable scope and may be sized and configured to be connected to any other suitable gun.

Figure 2:
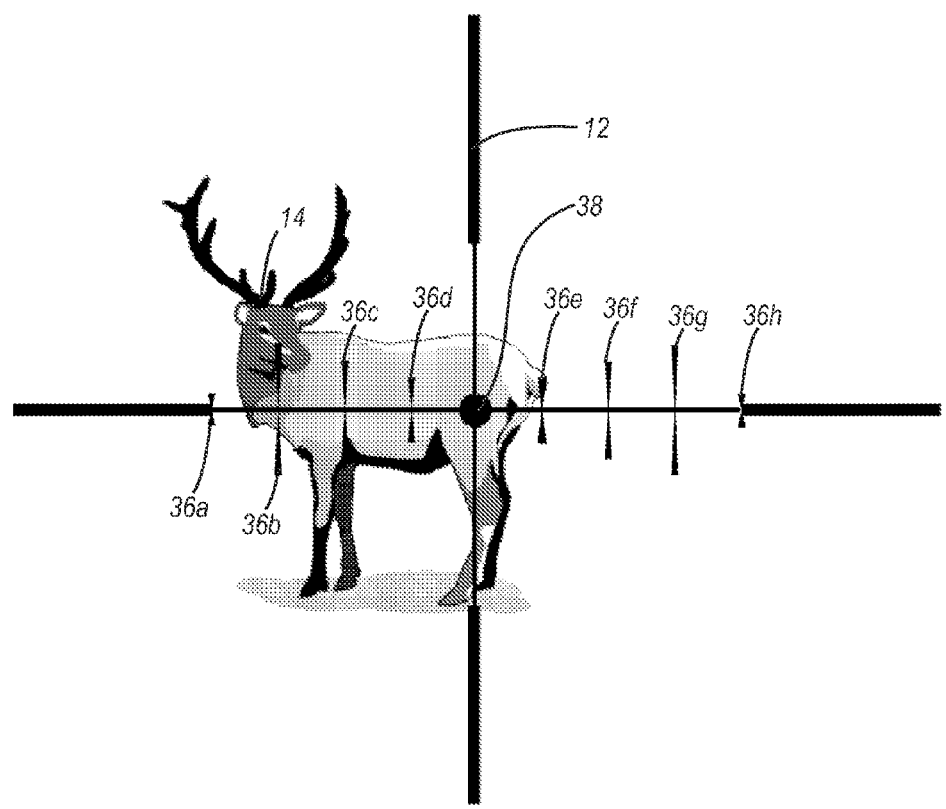
FIG. 2 is a diagram of an exemplary reticle that may be used in connection with the scope shown in FIG. 1, illustrating the reticle aiming at an exemplary target.

As shown in FIG. 2, the scope 10 may include a reticle 12 that may facilitate aiming at a target 14. It will be appreciated that the reticle 12 may have any suitable shape and/or configuration and that a target 14 may include animals (such as deer, elk, bears, varmints and the like), inanimate objects (such as paper targets) or any other suitable target.

As shown in FIGS. 2-5, the scope 10 preferably includes an adjustment dial 16 (such as, a turret, a knob, a wheel, a disk or plate, or other adjustment mechanism), which may be used to adjust the scope. Desirably, the adjustment dial 16 may be rotated or otherwise moved among a plurality of positions to configure the scope to compensate for projectile drops associated with various distances to a target.

Figure 5:
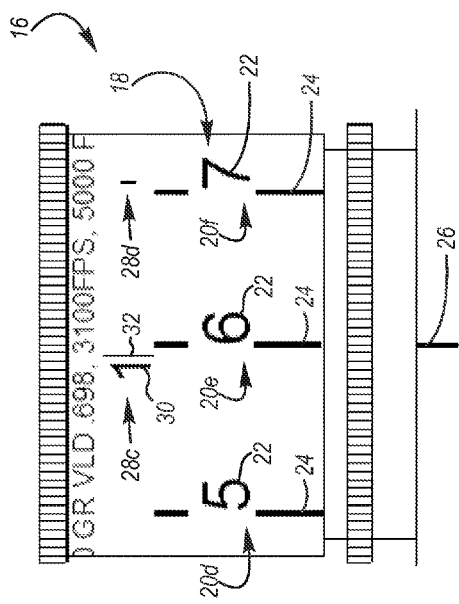
FIG. 5 is a front view of a portion of the scope shown in FIG. 1, illustrating an exemplary adjustment dial.
Figure 6:
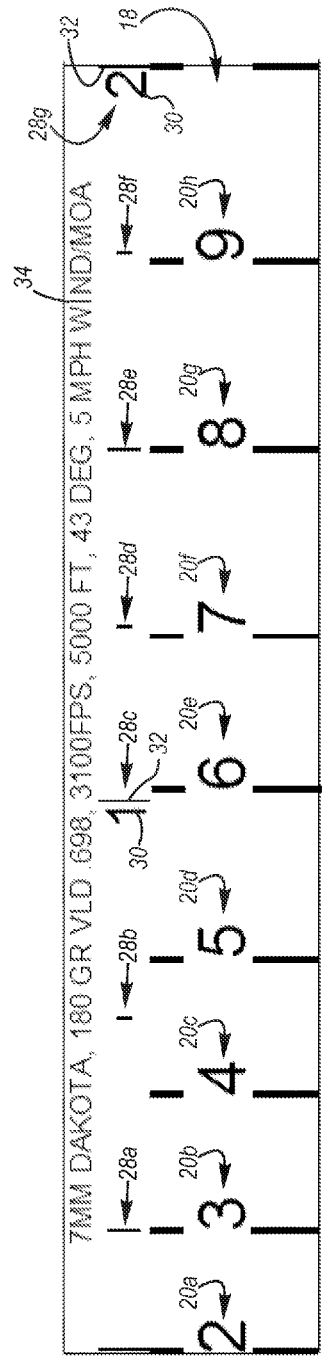
FIG. 6 is a diagram of exemplary dial-calibration data that may be used to label the adjustment dial shown in FIG. 5.

In further detail, as shown in FIGS. 5-6, the adjustment dial 16 may include dial-calibration data 18, which may include one or more distance indicators 20 (such as distance indicators 20a-h) configured to indicate a distance to a target. A distance indicator 20 may include, for example, a number or other symbol 22 indicating a distance to a target. The distance indicator 20 may also include a reference mark 24, which may be associated with the number or symbol. The distance indicator 20, however, does not require any number or symbol 22 and may simply include a reference mark 24, if desired.

The dial-calibration data 18 preferably includes a plurality of distance indicators 20 configured to indicate various distances. For example, a first distance indicator 20 may indicate a first distance to a target and a second distance indicator 20 may indicate a second distance to a target. Desirably, when the first distance indicator 20 is aligned with a reference mark 26 of the scope 10, the scope is preferably configured to compensate for a first projectile drop associated with the first distance, and when the second distance indicator 20 is aligned with the scope's reference mark 26, the scope is preferably configured to compensate for a second projectile drop associated with the second distance.

Consequently, the adjustment dial 16 may be rotated or otherwise moved within a range of positions in which the reference mark 26 is aligned with, or positioned between, various distance indicators 20. When the reference mark 26 is aligned with a distance indicator 20, the scope 10 is preferably configured to compensate for a projectile drop associated with the distance associated with the distance indicator. When the reference mark 26 is positioned between a pair of distance indicators 20, the scope 10 is preferably configured to compensate for a projectile drop associated with a distance between the distances associated with the pair of distance indicators. Desirably, the adjustment dial 16 may be rotated or otherwise moved within a range of discrete positions (using, for example, "clicks") or within an at least substantially continuous range of positions.

As shown in FIGS. 5-6, the dial-calibration data 18 may include the distance indicators 20a-h configured to indicate 200 yards, 300 yards, 400 yards, 500 yards, 600 yards, 700 yards, 800 yards and 900 yards, respectively. It will be appreciated, however, that the dial-calibration data 18 may include any other suitable number of distance indicators configured to indicate any other suitable distances.

As shown in FIGS. 5-6, the dial-calibration data 18 may also include one or more windage hold-off indicators 28 (such as windage hold-off indicators 28a-g) configured to indicate a hold-off to compensate for an amount of deflection caused by a crosswind. An exemplary hold-off may include a number of hash marks, dots or other such features of a reticle; a minutes-of-angle ("MOA") adjustment; and/or any other suitable hold-off.

A windage hold-off indicator 28 may include, for example, a number or other symbol 30 indicating a hold-off for an amount of crosswind deflection. The windage hold-off indicator 28 may also include a reference mark 32, which may be associated with the number or symbol. The windage hold-off indicator 28, however, does not require any number or symbol 30 and may simply include a reference mark 32, if desired.

The dial-calibration data 18 preferably includes a plurality of windage hold-off indicators 28 configured to indicate various hold-offs. For example, a first windage hold-off indicator 28 may indicate a first hold-off for a first amount of crosswind deflection and a second hold-off indicator 28 may indicate a second hold-off for a second amount of crosswind deflection.

The windage hold-off indicators 28 may be configured to indicate various hold-offs depending, for example, upon the distance to a target. In further detail, when a windage hold-off indicator 28 is aligned with a distance indicator 20, the windage hold-off indicator 28 preferably indicates a hold-off for crosswind deflection from a target that is located at the distance associated with the distance indicator. When a windage hold-off indicator 28 is positioned between a pair of distance indicators 20, the windage hold-off indicator 28 preferably indicates a hold-off for crosswind deflection from a target that is located at a distance between the distances associated with the pair of distance indicators. Thus, the windage hold-off indicators 28 may be configured to indicate various hold-offs depending, for example, upon the distance to target.

Significantly, the windage hold-off indicators 28 may advantageously allow a shooter to quickly and easily apply a hold-off tailored to a selected distance to a target. In further detail, to configure the scope 10 to compensate for a projectile drop associated with a particular distance to a target, the shooter may rotate or move the adjustment dial 16 within a range of positions in which the reference mark 26 is aligned with, or positioned between, various distance indicators 20, as discussed above. After the adjustment dial 16 has been rotated or moved to select the distance to the target, the reference mark 26 may be aligned with, or positioned between, various windage hold-off indicators 28, thus advantageously allowing the shooter to quickly identify a hold-off tailored to the selected distance to the target. In particular, if the reference mark 26 is aligned with a windage hold-off indicator 28, the shooter may know to use the hold-off indicated by the windage hold-off indicator 28. In addition, if the reference mark 26 is positioned between a pair of windage hold-off indicators 28, the shooter may know to use a hold-off between the hold-offs associated with the pair of windage hold-off indicators. Either way, the shooter may quickly identify a hold-off tailored to the selected distance to the target and then quickly apply that hold-off.

Preferably, some or all of the windage hold-off indicators 28 may be configured to indicate various hold-offs for various amounts of deflection caused by a particular amount of crosswind, but at different distances to a target. For example, as shown by a notation 34 in FIG. 6, the windage hold-off indicators 28 may be configured to indicate minute-of-angle ("MOA") adjustments that compensate for particular amount of crosswind, such as a 5 mile-per-hour ("MPH") crosswind. In this example, the windage hold-off indicator 28c includes a number "1" that indicates a 1 MOA adjustment for a 5 MPH crosswind, and the windage hold-off indicator 28g includes a number "2" that indicates a 2 MOA adjustment for a 5 MPH crosswind. In addition, in this example, the windage hold-off indicators 28a, 28b, 28d, 28e, 28f respectively indicate a ½ MOA adjustment, a ¾ MOA adjustment, a 1¼ MOA adjustment, a 1½ MOA adjustment and a 1¾ MOA adjustment for a 5 MPH crosswind. Thus, for instance, when the adjustment dial 16 has been rotated or moved to select a distance to a target (as discussed above) and the reference mark 26 is aligned with the windage hold-off indicator 28c, a shooter may quickly and easily see that a 1 MOA hold-off should be applied to adjust for a 5 MPH crosswind. Also, for instance, when the adjustment dial 16 has been rotated or moved to select a distance to a target (as discussed above) and the reference mark 26 is positioned between the windage hold-off indicators 28e, 28f, the shooter may quickly and easily see that a hold-off between ½ MOA and ¼ MOA should be applied to adjust for a 5 MPH crosswind.

In some embodiments, where a windage hold-off indicator 28 may be configured to indicate a hold-off for a first amount of crosswind, a shooter may quickly and easily calculate a hold-off for a second amount of crosswind by multiplying the indicated hold-off by (y/x), where x is the first amount of crosswind and y is the second amount of crosswind. Thus, if the first amount of crosswind is 5 MPH, the indicated hold-off should be doubled when second amount of crosswind is 10 MPH (y/x=10/5=2) or tripled when the second amount of crosswind is 15 MPH (y/x=15/5=3). Thus, when the adjustment dial 16 has been rotated or moved to select a distance to a target (as discussed above) and the reference mark 26 is aligned with the windage hold-off indicator 28c, a shooter may quickly and easily see that a 1 MOA hold-off should be applied to adjust for a 5 MPH crosswind, a 2 MOA hold-off should be applied to adjust for a 10 MPH crosswind or a 3 MOA hold-off should be applied to adjust for a 15 MPH crosswind.

In the examples above, the windage hold-off indicators 28 may have been illustrated to be configured to indicate hold-offs for a 5 MPH crosswind; however, the windage hold-off indicators 28 may be configured to indicate hold-offs for a 1 MPH crosswind, a 2 MPH crosswind, a 5 MPH crosswind, a 10 MPH crosswind, a 20 MPH crosswind or any larger or smaller crosswind, if desired. In addition, although the windage hold-off indicators 28 may have been illustrated to be configured to indicate MOA hold-offs, the windage hold-off indicators 28 need not be configured to indicate MOA hold-offs and that the windage hold-off indicators may be configured to indicate other types of hold-offs.

Figure 12:
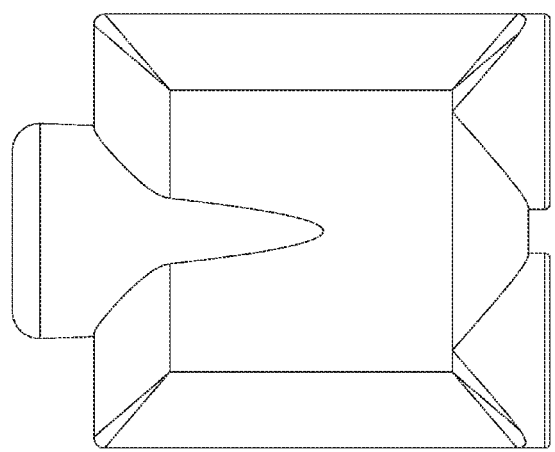
FIG. 12 is a top view of the electronic device shown in FIG. 11.

As shown in FIG. 2, the reticle 12 may include one or more hash marks, dots or other such features sized and configured to indicate one or more hold-offs that may be quickly and easily used to aim at a target 14. For example, the reticle 12 may include hash marks 36a-h, which may indicate various hold-offs from a "zero point" 38. Thus, when the adjustment dial 16 has been rotated or moved to select a distance to a target and the shooter determines the hold-off that should be applied, the shooter may aim the hash mark 36 associated with that hold-off at the target 14. For instance, after determining that the hash mark 36c is associated with the proper hold-off, shooters may aim the hash mark 36c at a desired portion of the target 14, as shown in FIG. 12, and may shoot their gun.

As discussed below with reference to the various processes and systems, the dial-calibration data 18 may be at least partially generated using one or more of the following factors: sight-height data, muzzle velocity data, dial specification data, ballistics coefficient data, ballistics performance data, projectile-form-factor data, projectile caliber, projectile weight, air-density factors (such as, pressure data, temperature data, elevation data, humidity data and/or other air-density factors) and wind data. Significantly, using one or more of these factors may allow more accurate dial-calibration data 18 to be generated—thus facilitating more accurate shooting with the scope 10. It will be appreciated, however, that the dial-calibration data 18 may be at least partially generated using these factors and/or other factors using other processes and/or systems. Thus, the exemplary processes and systems discussed below are not required and are merely used for illustration.

Figure 7A:
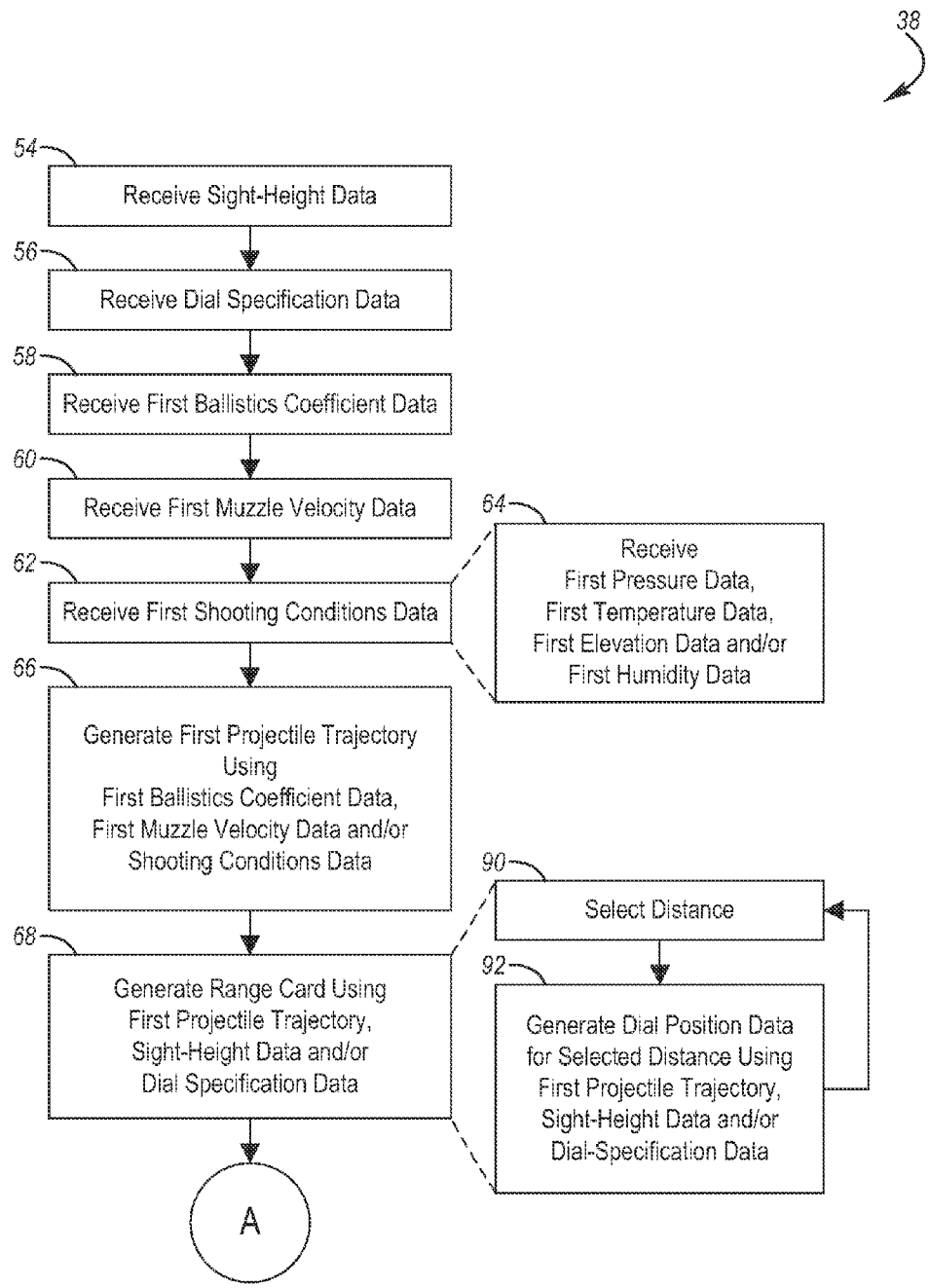
FIGS. 7A and 7B are flowcharts illustrating an exemplary method.
Figure 7B:
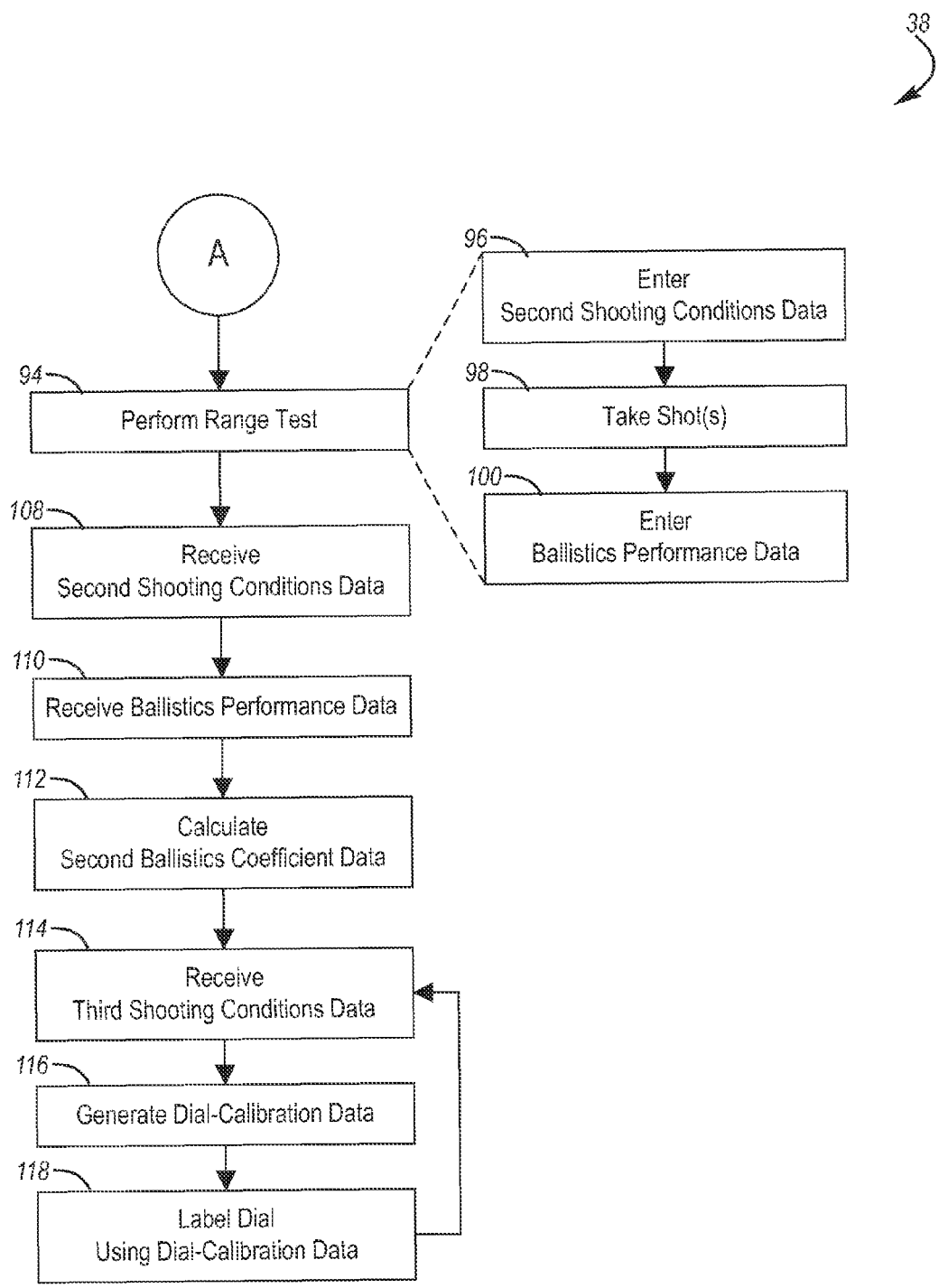
Figure 8:
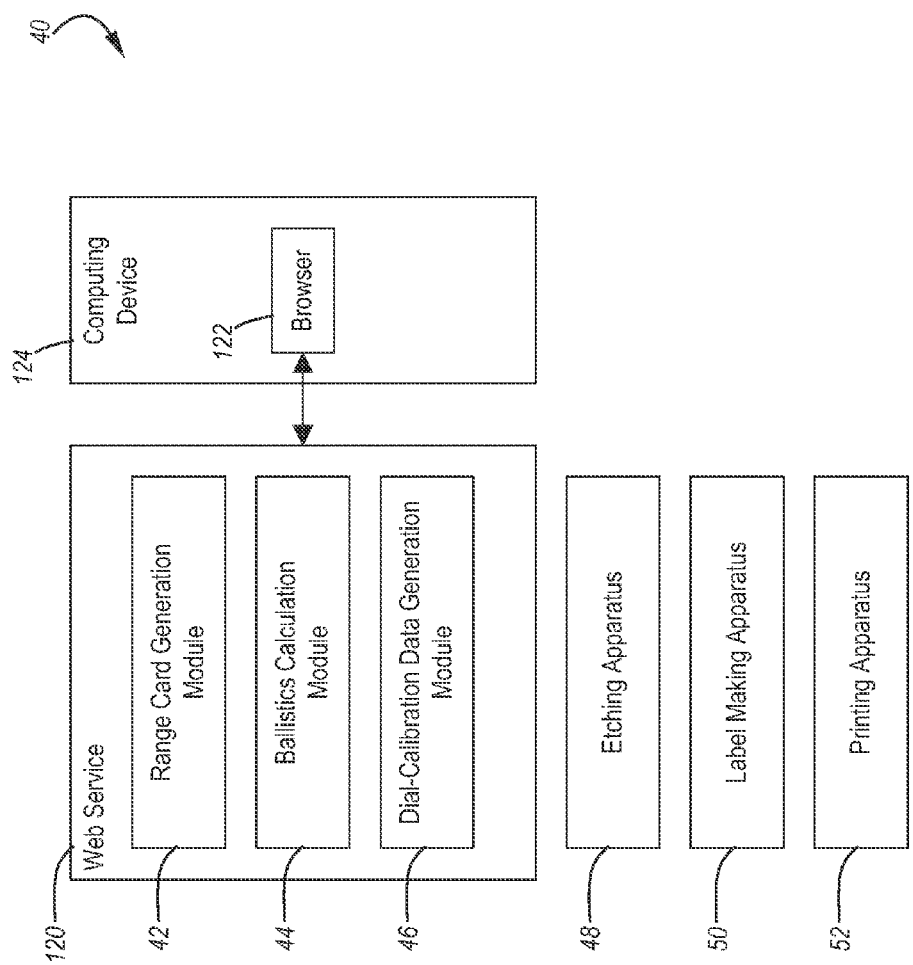
FIG. 8 is a block diagram illustrating an exemplary system.

An exemplary method 38 shown in FIGS. 7A-7B may be used to make at least a portion of the scope 10, and an exemplary system 40 shown in FIG. 8 may include a range card generation module 42, a ballistics calculation module 44, a dial-calibration data generation module 46, an etching apparatus 48, a label making apparatus 50 and a printing apparatus 52. Desirably, some or all of the method 38 may be performed by the system 40; the range card generation module 42; the ballistics calculation module 44; the dial-calibration data generation module 46; the etching apparatus 48; the label making apparatus 50; the printing apparatus 52; other systems, modules, apparatuses and the like; or any combination thereof. Of course, the entire method 38 need not be performed; and any part or parts of the method 38 may be performed alone, or in combination other methods, to provide a useful result.

In further detail, the range card generation module 42 may receive sight-height data at block 54. The sight-height data preferably indicates a position of the scope 10 relative to a gun to which the scope is attached. For instance, the sight-height data may indicate the distance from the center axis of the scope 10 to the center axis of the barrel of the gun. At block 56, the range card generation module 42 may receive dial specification data. The dial specification data preferably indicates a range of positions among which the adjustment dial 16 may be rotated or moved and how those positions configure the scope 10 to compensate for projectile drops. For example, the dial specification data may indicate a one or more "clicks" among which the adjustment dial 16 may be rotated or moved and how the "clicks" alter the aim of the scope 10 to compensate for projectile drops, such as, a MOA adjustment provided by a "click."

At block 58, the ballistics calculation module 44 may receive first ballistics coefficient data. The first ballistics coefficient data may indicate a ballistics coefficient, such as a ballistics coefficient provided by a manufacturer of a projectile to be shot by the gun to which the scope 10 is attached. At block 60, the ballistics calculation module 44 may receive first muzzle velocity data. The first muzzle velocity data may indicate a muzzle velocity, such as a muzzle velocity provided by the projectile manufacturer. At block 62, the ballistics calculation module 44 may receive first shooting conditions data. The first shooting conditions data may indicate one or more shooting conditions under which a range test is expected to be performed. For example, the first shooting conditions data may include first pressure data, first temperature data, first elevation data and/or first humidity data, which may respectively indicate the barometric pressure, the temperature, the elevation and/or the humidity at which the range test is expected to be performed. Thus, as shown in FIG. 7A, block 62 may include block 64 at which the ballistics calculation module 44 may receive the first pressure data, the first temperature data, the first elevation data and/or the first humidity data. The first shooting conditions data, however, does not require the first pressure data, the first temperature data, the first elevation data or the first humidity data and may include data indicating other shooting conditions.

At block 66, the ballistics calculation module 44 may generate first projectile trajectory data configured to indicate a trajectory for a projectile. The ballistics calculation module 44 may generate the first projectile trajectory data using the first ballistics coefficient data received at block 58, the first muzzle velocity data received at block 60, some or all of the first shooting conditions data received at block 62 and/or other data (for instance, a drag model associated with a projectile's form factor).

Figure 9:
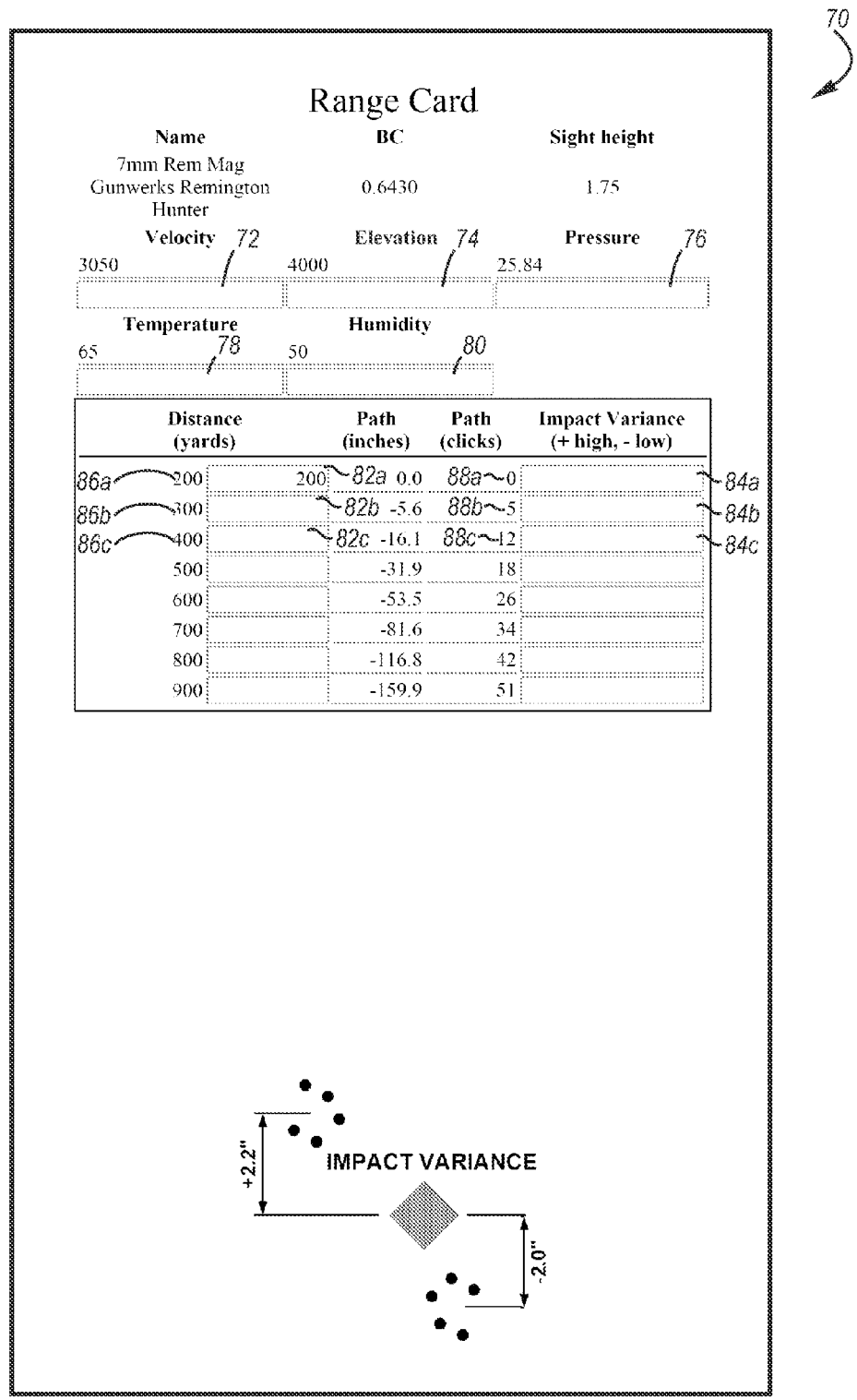
FIG. 9 is a diagram of an exemplary range card.

At block 68, the range card generation module 42 may generate a range card, such as a range card 70 shown in FIG. 9. As shown in FIG. 6, the range card 70 may include fields (such as fields 72, 74, 76, 78, 80, 82, 84) into which shooting conditions data, ballistics performance data and/or other data may be entered. The range card 70 may also include distance data 86 configured to indicate one or more distances from which projectiles may be shot as part of a range test. The range card 70 may further include dial position data 88 configured to indicate one or more positions for the adjustment dial 16 to be used when those projectiles are shot by the gun to which the scope 10 is attached. For example, the dial position data 88 may be configured to indicate one or more "clicks" of the adjustment dial 16.

In further detail, the block 68 may include blocks 90, 92. At block 90, the range card generation module 42 may select a distance and, at block 92, may generate dial position data 88 associated with the distance selected at the block 90. Preferably, at block 92, the range card generation module 42 may generate dial position data 88 that indicates a position for the adjustment dial 16 that configures the scope 10 to compensate for an expected projectile drop at the selected distance. In particular, at block 92, the range card generation module 42 preferably generates this dial position data 88 using the first projectile trajectory generated at block 66, the sight-height data received at block 54, the dial specification data received at block 56 and/or other data.

As shown in FIG. 7A, blocks 90, 92 may be repeated for several different distances. For example, blocks 90, 92 may be repeated to generate dial position data 88 for 200 yards, 300 yards, 400 yards, 500 yards, 600 yards, 700 yards, 800 yards, 900 yards and/or other distances, as illustrated by the range card 70 shown in FIG. 9.

As shown in FIG. 7B, a shooter may perform a range test at block 94. For example, the block 94 may include blocks 96, 98, 100 at which the shooter may enter second shooting conditions in the range card 70, take one or more shots at targets positioned at various distances using the gun to which the scope 10 is attached, and enter ballistics performance data associated with those shots in the range card 70.

In further detail, the second shooting conditions may include second elevation data, second pressure data, second temperature data, and/second humidity data; and at block 96, the shooter may enter the second elevation data, the second pressure data, the second temperature data, and/the second humidity data into the fields 74, 76, 78, 80 of the range card 70. The second pressure data, the second temperature data, the second elevation data and the second humidity data may respectively indicate the barometric pressure, the temperature, the elevation and/or the humidity at which one or more of the shots are taken at block 98. The second shooting conditions data, however, does not require the second pressure data, the second temperature data, the second elevation data or the second humidity data and may include data indicating other shooting conditions.

At block 98, a shooter may take one or more shots at some or all of the distances indicated by the distance data 86. In particular, after positioning the adjustment dial 16 to the position indicated by the dial position data 88, the shooter may take one or more shots at the distance indicated by its associated distance data 86. For example, after positioning the adjustment dial 16 to the position indicated by the dial position data 88c (twelve "clicks"), the shooter may take one or more shots at the distance indicated by its associated distance data 86c (400 yards). The shooter preferably takes multiple shots at each distance, for example, about five to ten shots at each distance. Of course, more or fewer shots may be taken, if desired. The shooter preferably takes the shots at block 98 using a particular type of projectile (for instance, projectiles sharing the same caliber, weight, form factor, manufacturer and/or the like) to obtain ballistics performance data for that particular type of projectile, as fired by the particular gun connected to the scope 10.

As part of the range test performed at block 94, the shooter may "zero" the scope 10, for example, prior to taking some or all of the shots taken at the block 98. For instance, as shown in the range card 70, it may be expected that the adjustment dial 16 will require zero "clicks" to compensate for a projectile drop at 200 yards. In this example, one or more practice shots at 200 yards may be taken to determine a position of the adjustment dial 16 at which the scope 10 adequately compensates for projectile drop at 200 yards, and after taking these practice shots, the adjustment dial 16 may be recalibrated to a zero point.

Figure 3:
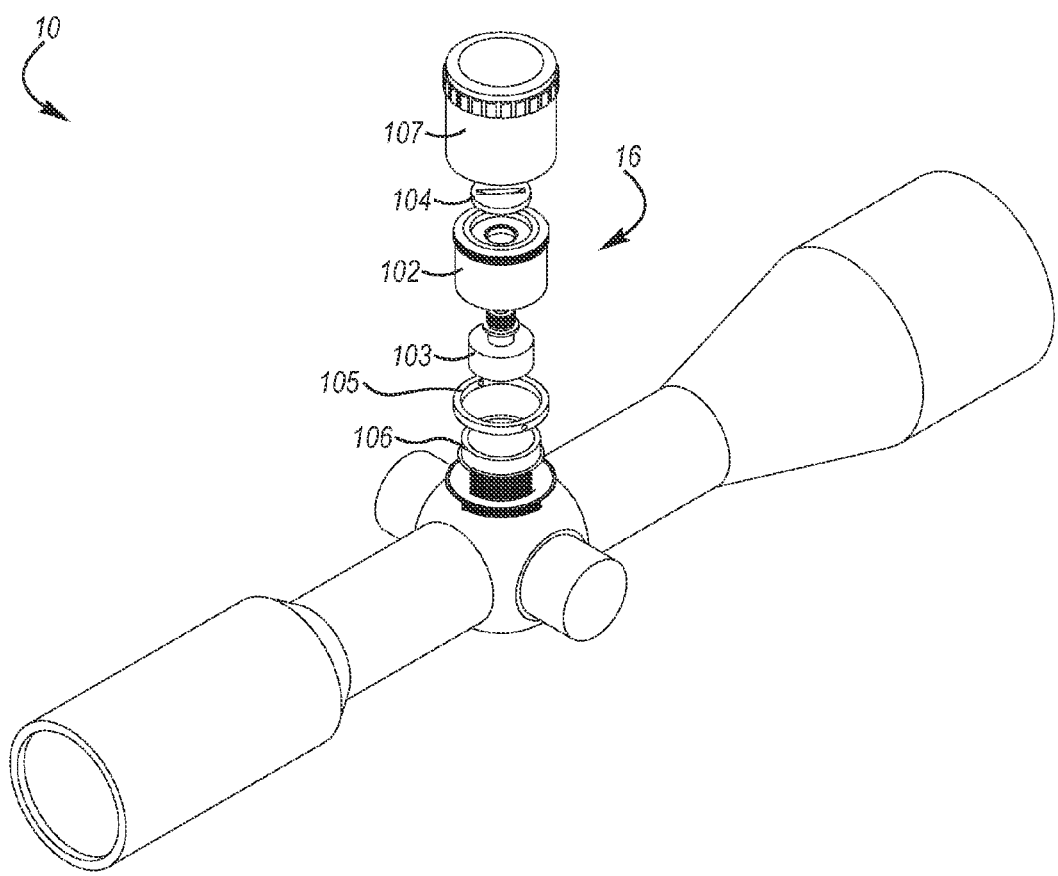
FIG. 3 is an exploded view of the scope shown in FIG. 1.
Figure 4:
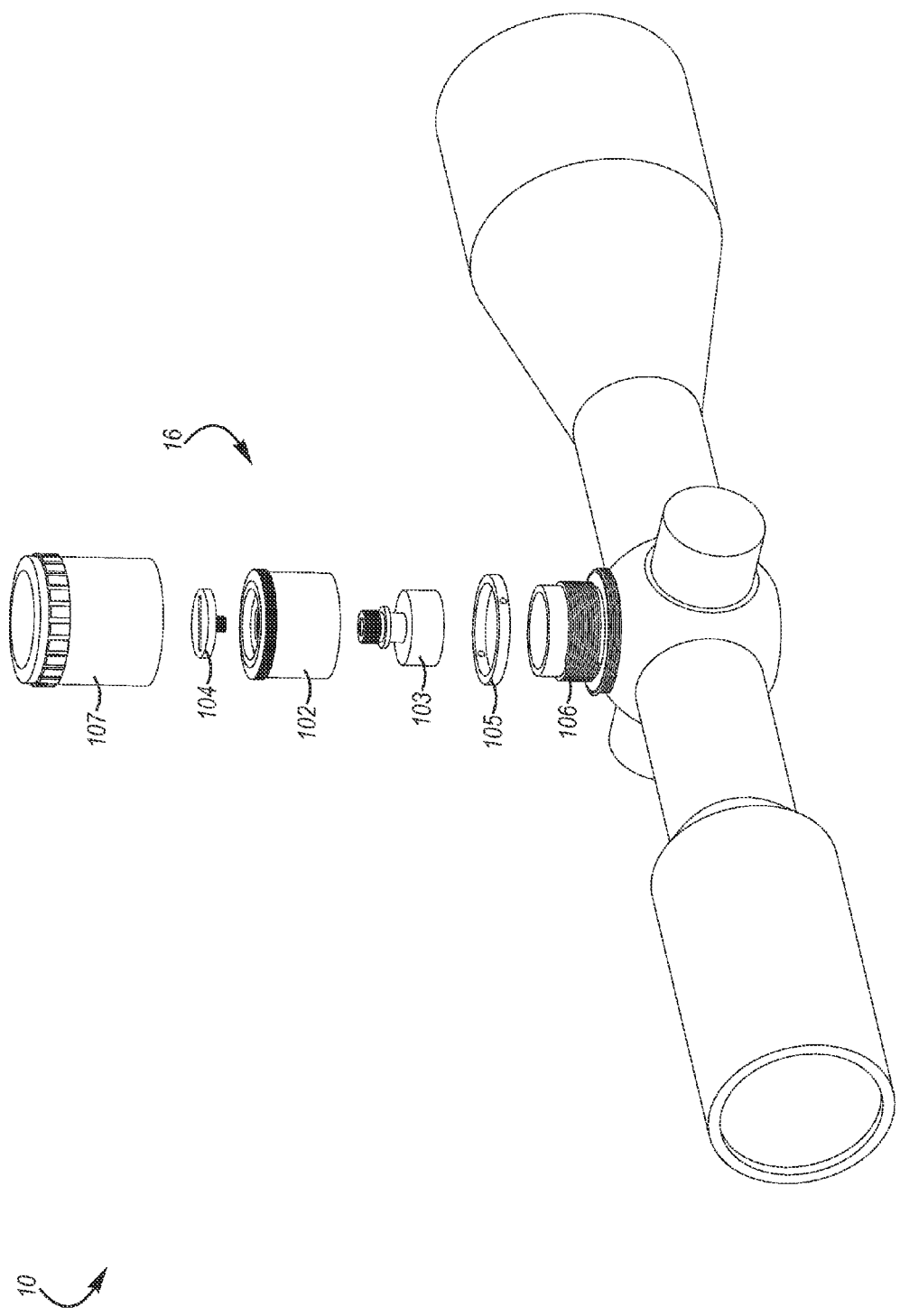
FIG. 4 is another exploded view of the scope shown in FIG. 1.

In further detail, as shown in FIGS. 3-4, the adjustment dial 16 may include a turret 102 that may be selectively connected to a spindle 103 in a variety of relative positions using, for example, a screw 104. Consequently, with the adjustment dial 16 at which the scope 10 adequately compensates for projectile drop at 200 yards, the adjustment dial 16 may be recalibrated to a zero point by connecting the turret 102 to the spindle 103 at that zero point. It will be appreciated, however, that the shooter need not "zero" the scope 10 as part of the range test performed at the block 94.

The adjustment dial 16 may also include a stop 105, a base 106 and a dust cover 107, if desired. The adjustment dial 16 may, as discussed above, rotate or move within a range of positions to select various distances to a target, and the stop 105 may be configured to limit that rotation or movement. In particular, the stop 105 may be configured to limit the rotation of the adjustment dial 16 to one revolution or a fraction of a revolution, which may help avoid confusion relating to rotating the adjustment dial 16 more than one times. In addition, this may allow the adjustment dial 16 to be quickly returned to a minimum or maximum rotational position, if desired. The stop 105 preferably has a generally ring-shaped configuration; however, the stop 105 may have other suitable shapes and/or configurations. It will be appreciated that the adjustment dial 16 does not require the stop 105 and that the adjustment dial 16 may be configured to rotate more than one revolution, if desired.

At block 100, the shooter may record ballistics performance data associated with the shots taken at block 98. For example, the ballistics performance data may include an impact variance, such as a distance above or below an expected impact point. In particular, the ballistics performance data may include an impact variance for the distances at which the shots were taken, which the shooter may enter into the fields 84. The impact variance may comprise, for instance, an impact variance for a single shot taken at a particular distance or an average, a mean, a median or a mode of the impact variances for some or all of the shots taken the particular distance. The ballistics performance data may also include a muzzle velocity, which the shooter may enter into the field 72. The muzzle velocity may comprise, for instance, a muzzle velocity for a single shot taken during the range test or an average, a mean, a median or a mode of a muzzle velocity for some or all of the shots taken during the range test.

As shown in FIG. 7B, at block 108, the ballistics calculation module 44 may receive the second shooting conditions entered at block 96 and may, at block 110, receive the ballistics performance data entered at block 100.

At block 112, the ballistics calculation module 44 may calculate second ballistics coefficient data indicating a ballistics coefficient of the projectiles shot at block 98. For example, the ballistics calculation module 44 may calculate the second ballistics coefficient data using the shooting conditions received at block 108, the ballistics performance data received at block 110, the first projectile trajectory generated at block 66 and/or other data. As mentioned above, the shooter preferably takes the shots at block 98 using a particular type of projectile (for instance, projectiles sharing the same caliber, weight, form factor, manufacturer and/or the like) to obtain ballistics performance data for that particular type of projectile, as fired by the particular gun connected to the scope 10. Thus, if the second ballistics coefficient data is calculated using the ballistics performance data received at block 110, the second ballistics coefficient data may more accurately reflect the ballistics coefficient for this particular type of projectile, as fired by the particular gun connected to the scope 10.

At block 114, the dial-calibration data generation module 46 may receive third shooting conditions data and may, at block 116, generate dial-calibration data 18. At block 118, the adjustment dial 16 of the scope may be labeled using the dial-calibration data generated at block 116.

In further detail, the third shooting conditions data received at block 114 may indicate one or more expected shooting conditions under which the gun is expected to be used. For example, the third shooting conditions data may include third pressure data, third temperature data, third elevation data and/or third humidity data, which may respectively indicate the barometric pressure, the temperature, the elevation and/or the humidity at which the gun is expected to be used. The third shooting conditions data, however, does not require the third pressure data, the third temperature data, the third elevation data or the third humidity data and may include data indicating other shooting conditions.

At block 116, the dial-calibration data generation module 46 may generate dial-calibration data 18, for example, the distance indicators 20, the windage hold-off indicators 28 and their relative positions. The dial-calibration data generation module 46 may generate dial-calibration data 18 using the second ballistics coefficient data calculated at block 112, the third shooting conditions data received at block 114, the ballistics performance data received at the block 110 (for instance, a muzzle velocity), the first projectile trajectory generated at block 66 and/or other data (such as the sight-height data received at block 54, the dial specification data received at block 56, and/or the first muzzle velocity received at block 60). Significantly, if the dial-calibration data generation module 46 generates the dial-calibration data 18 using the ballistics performance data received at the block 110 and/or the second ballistics coefficient data, the generated dial-calibration data 18 may be more accurately customized to the gun and type of projectiles shot during the range test performed at block 94. Moreover, if the dial-calibration data generation module 46 generates the dial-calibration data 18 using the sight-height data received at block 54 and/or the dial specification data received at block 56, the generated dial-calibration data 18 may be more accurately customized to the scope 10 and its position relative to the gun. Further, if the dial-calibration data generation module 46 generates the dial-calibration data 18 using the third shooting conditions data, the generated dial-calibration data 18 may be more accurately customized to particular shooting conditions under which the scope 10 and the gun are expected to be used.

It will be appreciated, however, that the dial-calibration data generation module 46 may generate dial-calibration data 18 without the range test performed at block 94 or its associated ballistics performance data. For example, the dial-calibration data generation module 46 may receive sight-height data, dial specification data, ballistics coefficient data, muzzle velocity data, shooting conditions data, other data or any combination thereof and may use such data to generate dial-calibration data 18 at block 116. The ballistics coefficient data may indicate a ballistics coefficient, such as a ballistics coefficient provided by a manufacturer of a projectile to be shot by the gun to which the scope 10 is attached. The muzzle velocity data may indicate a muzzle velocity, such as a muzzle velocity provided by the projectile manufacturer. The shooting conditions data may indicate one or more shooting conditions under which the gun is expected to be used.

At block 118, the adjustment dial 16 may be labeled using the dial-calibration data 18 generated at block 116. For example, at block 118, the etching apparatus 48 may use the generated dial-calibration data 18 to etch the distance indicators 20 and/or the windage hold-off indicators 28 into a portion of the adjustment dial 16, such as the turret 102. In another example, at block 118, the label making apparatus 50 may use the generated dial-calibration data 18 to create a label including the distance indicators 20 and/or the windage hold-off indicators 28, which label may be placed on a portion of the adjustment dial 16, such as the turret 102. In yet another example, at block 118, the printing apparatus 52 may use the generated dial-calibration data 18 to print the distance indicators 20 and/or the windage hold-off indicators 28 onto a portion of the adjustment dial 16, such as the turret 102. It will be appreciated, however, that the adjustment dial 16 may be labeled using the generated dial-calibration data 18 using other suitable means.

If desired, a plurality of turrets 102 may be interchangeably used with the scope 10. In particular, some or all of the method 38 may be repeatedly performed to create a plurality of turrets 102 that may be interchangeably connected to the scope 10. Significantly, this may allow the turrets 102 to be labeled with different dial-calibration data 18 that is customized to different types of projectiles, different shooting conditions, etc.

For example, a plurality of range tests may be performed to create different turrets 102 suitable for different types of projectiles. In addition, blocks 114, 116, 118 may be repeated to label multiple turrets 102 with dial-calibration data 18 generated using different shooting conditions. Thus, the turrets 102 may be customized to the different shooting conditions under which the scope 10 and the gun are expected to be used. In some instances, the different turrets 102 may include dial-calibration data 18 generated using different elevations (such as, 2,000 feet; 4,000 feet; 6,000 feet; 8,000 feet; etc.). In such instances, when at a first elevation, a shooter may connect (to the scope 10) a first turret 102 having first dial-calibration data 18 suitable for the first elevation; and when the shooter goes to a second elevation, the shooter may disconnect the first turret and replace it with a second turret 102 having second first dial-calibration data 18 suitable for the second elevation.

As discussed above, the range card module 42, the ballistics calculation module 44 and/or the dial-calibration data generation module 46 may receive sight-height data, dial specification data, ballistics coefficient data, muzzle velocity data, shooting conditions data and/or other data. As discussed below, the modules may send and/or receive this data in a variety of different ways.

In some embodiments, as shown in FIG. 8, the range card module 42, the ballistics calculation module 44 and/or the dial-calibration data generation module 46 may be implemented as a part of a web service 120, which may be configured to receive this data via a network, such as the Internet, a local area network (LAN), a wide area network (WAN), other types of networks, or the like. For example, the range card module 42, the ballistics calculation module 44 and/or the dial-calibration data generation module 46 of the web service 120 may receive such data from a browser or other software program 122, which may be operating on a computing device 124, such as a desktop computer, a laptop computer, a palm-top computer, a personal digital assistant (PDA), a mobile phone, other computing devices, and the like. In particular, the browser 122 may receive and display a web page from the web service 120, and the web page may be configured to receive user input including sight-height data, dial specification data, ballistics coefficient data, muzzle velocity data, shooting conditions data, other data or any combination thereof. For instance, in one embodiment, the range card 70 generated at block 68 in FIG. 7A may be a web page, which a person may print out. Using this print-out, a person may manually record the second shooting conditions data and/or ballistics performance data. Afterwards, the person may enter the second shooting conditions data and/or ballistics performance data into this range-card web page (or another web page) at blocks 96 and 100 in FIG. 7B. The browser 122 may then send this user input to the web service 120 via the web page. The web service 120 may be hosted by, for example, a suitable hardware device.

Figure 10:
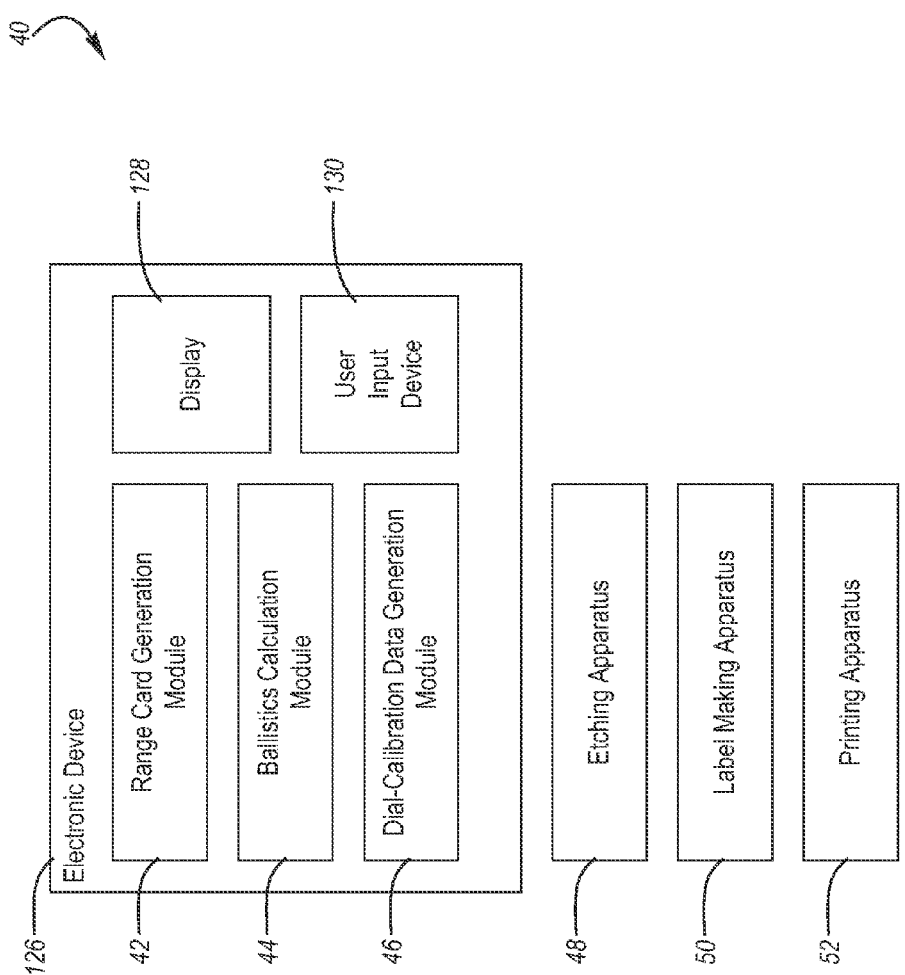
FIG. 10 is a block diagram illustrating another exemplary system.
Figure 11:
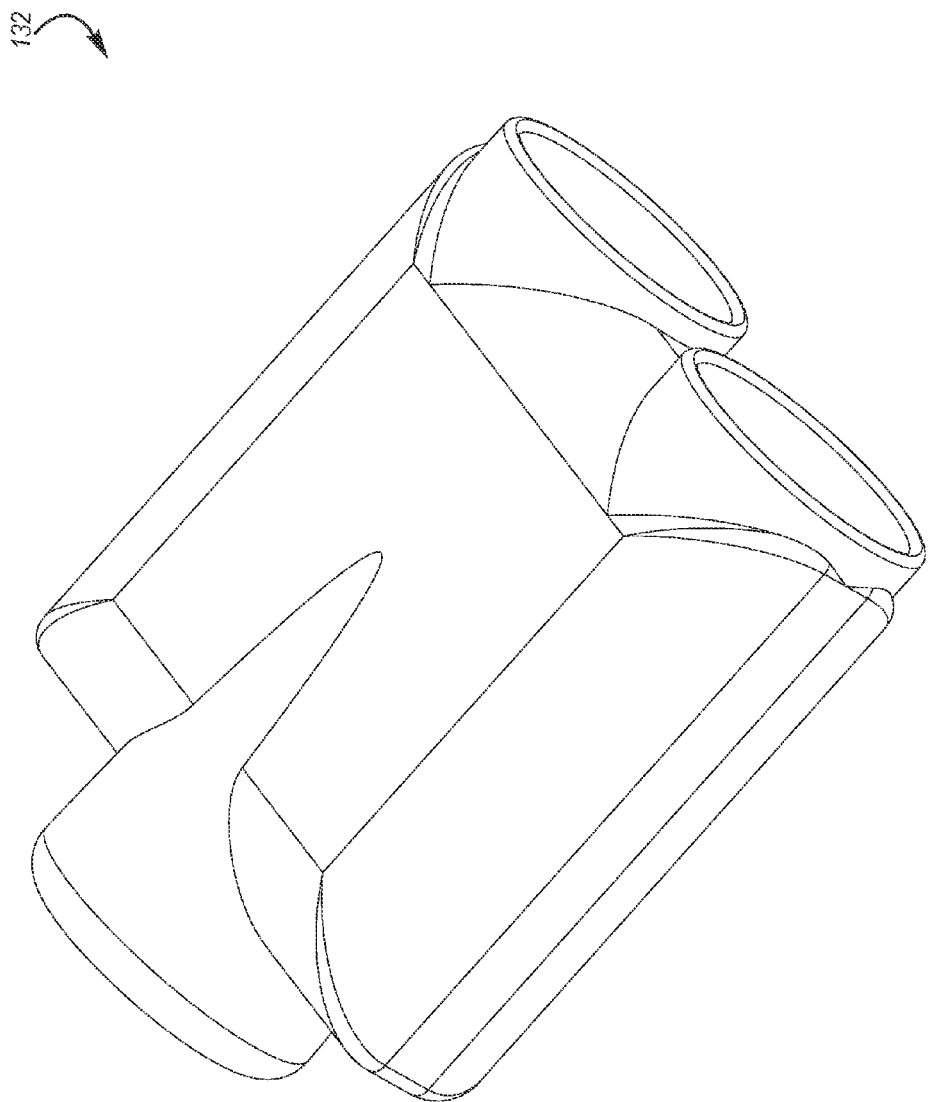
FIG. 11 is a perspective view of an exemplary electronic device.
Figure 13:
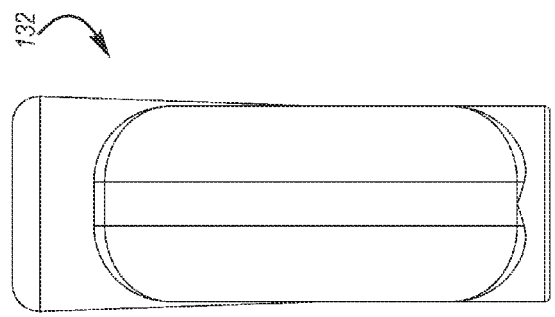
FIG. 13 is a side view of the electronic device shown in FIG. 11.
Figure 14:
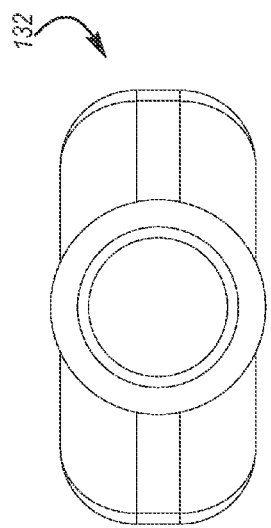
FIG. 14 is a rear view of the electronic device shown in FIG. 11.

In some embodiments, as shown in FIG. 10, the range card module 42, the ballistics calculation module 44 and/or the dial-calibration data generation module 46 may be implemented as a part of an electronic device 126, such as a computing device, a laser range finder or other suitable electronic device. The electronic device 126 may include a display 128 and one or more user input devices 130, such as a keyboard, pushbuttons, etc. The display 128 may display a user interface configured to receive user input including sight-height data, dial specification data, ballistics coefficient data, muzzle velocity data, shooting conditions data and/or other data. For instance, in one embodiment, the display 128 may display the range card 70 generated at block 68 in FIG. 7A, and a person may use the user input device 130 to enter the second shooting conditions data and/or ballistics performance data into the displayed range card at blocks 96 and 100 in FIG. 7B. It will be appreciated, however, that the range card module 42, the ballistics calculation module 44 and the dial-calibration data generation module 46 need not be implemented as a part of an electronic device 126 or a web service 120 and may be implemented in other suitable devices, systems, etc.

As shown in FIGS. 11-15, the system 40 may include an electronic device 132. The electronic device 132 preferably includes a derived-distance calculation module 134, which may be configured to use a distance to a target to calculate a derived distance that may be used in connection with an adjustment dial 16.

As mentioned above, the adjustment dial 16 may include dial-calibration data 18 that may be customized to a set of shooting conditions under which the scope 10 and the gun are expected to be used. For example, the dial-calibration data 18 may include one or more distance indicators 20 customized to these expected shooting conditions.

Significantly, when the scope 10 and the gun are to be used under actual shooting conditions that differ from these expected shooting conditions, the derived-distance calculation module 134 may advantageously use a distance to a target to calculate a derived distance that, when the adjustment dial 16 has been rotated or moved to select the derived distance, the scope 10 is configured to compensate for a projectile drop for the distance to the target under the actual shooting conditions. To calculate the derived distance, the derived-distance calculation module 134 may use the distance to the target and any other suitable data, for instance, the dial-calibration data 18, expected shooting conditions data, sight-height data, dial specification data, ballistics coefficient data, muzzle velocity data, actual shooting conditions data and/or other data. The electronic device 132 may include a display 136, which may advantageously display the derived distance to a shooter who may quickly and easily rotate or otherwise move the adjustment dial 16 to select the derived distance.

In further detail, the expected shooting conditions data may include the shooting conditions data received at block 114 of the method 38. The ballistics coefficient data may indicate a ballistics coefficient, such as a ballistics coefficient provided by a manufacturer of a projectile to be shot by the gun or a ballistics coefficient calculated at block 112. The muzzle velocity data may indicate a muzzle velocity, such as a muzzle velocity provided by the projectile manufacturer or a muzzle velocity measured at block 100.

The actual shooting conditions data may indicate one or more shooting conditions under which the gun and the scope 10 are to be used. For example, the actual shooting conditions data may include pressure data, temperature data, elevation data and/or humidity data, which may respectively indicate the barometric pressure, the temperature, the elevation and/or the humidity at which the gun and the scope 10 are to be used. The actual shooting conditions data may also include wind data, which may indicate an amount and/or direction of wind present when the gun and the scope are to be used. The actual shooting conditions data may further include compass heading data and/or tilt data, which may respectively indicate the direction and/or the tilt (e.g., incline or decline) at which the gun and the scope 10 are to be used.

The actual shooting conditions data may be different from the expected shooting conditions data in a variety of ways. For example, the actual shooting conditions data may include additional types of data (such as wind data, compass heading data and/or incline data) that may not have been included in the expected shooting conditions used to generate the adjustment dial's dial-calibration data 18. Also for example, the actual shooting conditions data and the expected shooting conditions data may indicate different conditions, such as different barometric pressures, temperatures, elevations and/or humidity.

The derived-distance calculation module 134 may receive the dial-calibration data 18, the expected shooting conditions data, the sight-height data, the dial specification data, the ballistics coefficient data, the muzzle velocity data, the actual shooting conditions data and/or other data using a variety of means. In some embodiments, for example, the electronic device 132 may include a barometric pressure sensor 138, a temperature sensor 140, an elevation sensor 142, a humidity sensor 144, a wind sensor 146, a compass heading sensor 148 and/or a tilt sensor 150, which may sense actual shooting conditions and respectively send associated actual shooting conditions data to the derived-distance calculation module 134. In particular, the barometric pressure sensor 138, the temperature sensor 140, the elevation sensor 142, the humidity sensor 144, the wind sensor 146, the compass heading sensor 148 and the tilt sensor 150 may respectively send pressure data, temperature data, elevation data, humidity data, wind data, compass heading data and tilt data to the derived-distance calculation module 134. In some embodiments, the electronic device 132 may include a GPS module that may provide the elevation data or a location from which the elevation data may be derived.

In addition, as best seen in FIGS. 11-15, the electronic device 132 may be a laser range finder, which may include a laser transmit and receive device 152. The laser transmit and receive device 152 may be configured to transmit and receive light, for example, to help the laser range finder determine a distance to a target or other item, which the derived-distance calculation module 134 may use in calculating the derived distance. It will be appreciated, however, that the electronic device 132 does not require a laser transmit and receive device 152 and that the electronic device 132 need not be laser range finder. For instance, the electronic device 132 may be a laser range finder, a computing device or any other suitable electronic device.

Figure 15:
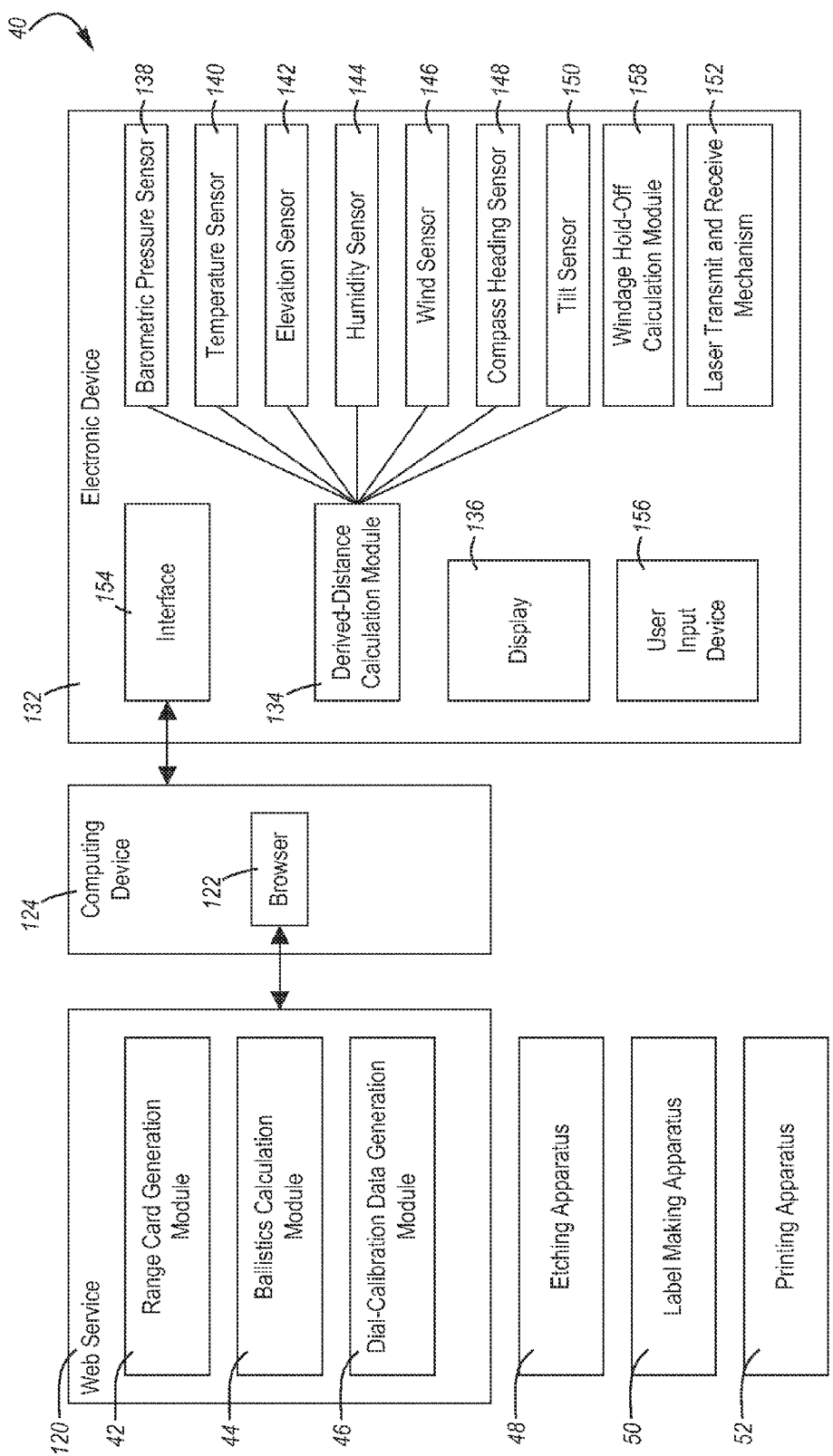
FIG. 15 is a block diagram illustrating an exemplary system, illustrating an exemplary configuration of an electronic device.
Figure 16:
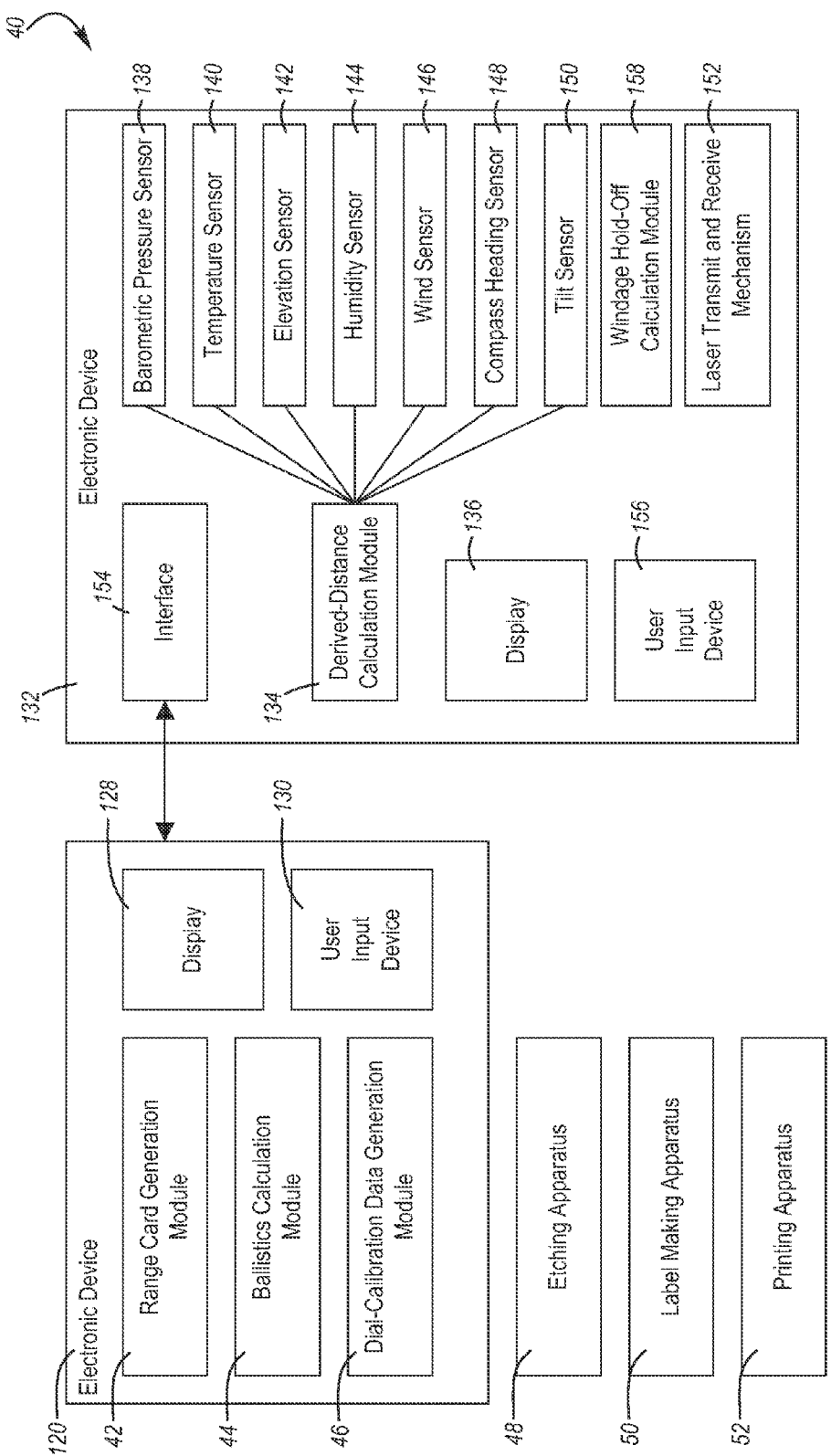
FIG. 16 is a block diagram illustrating another exemplary system.
Figure 17:
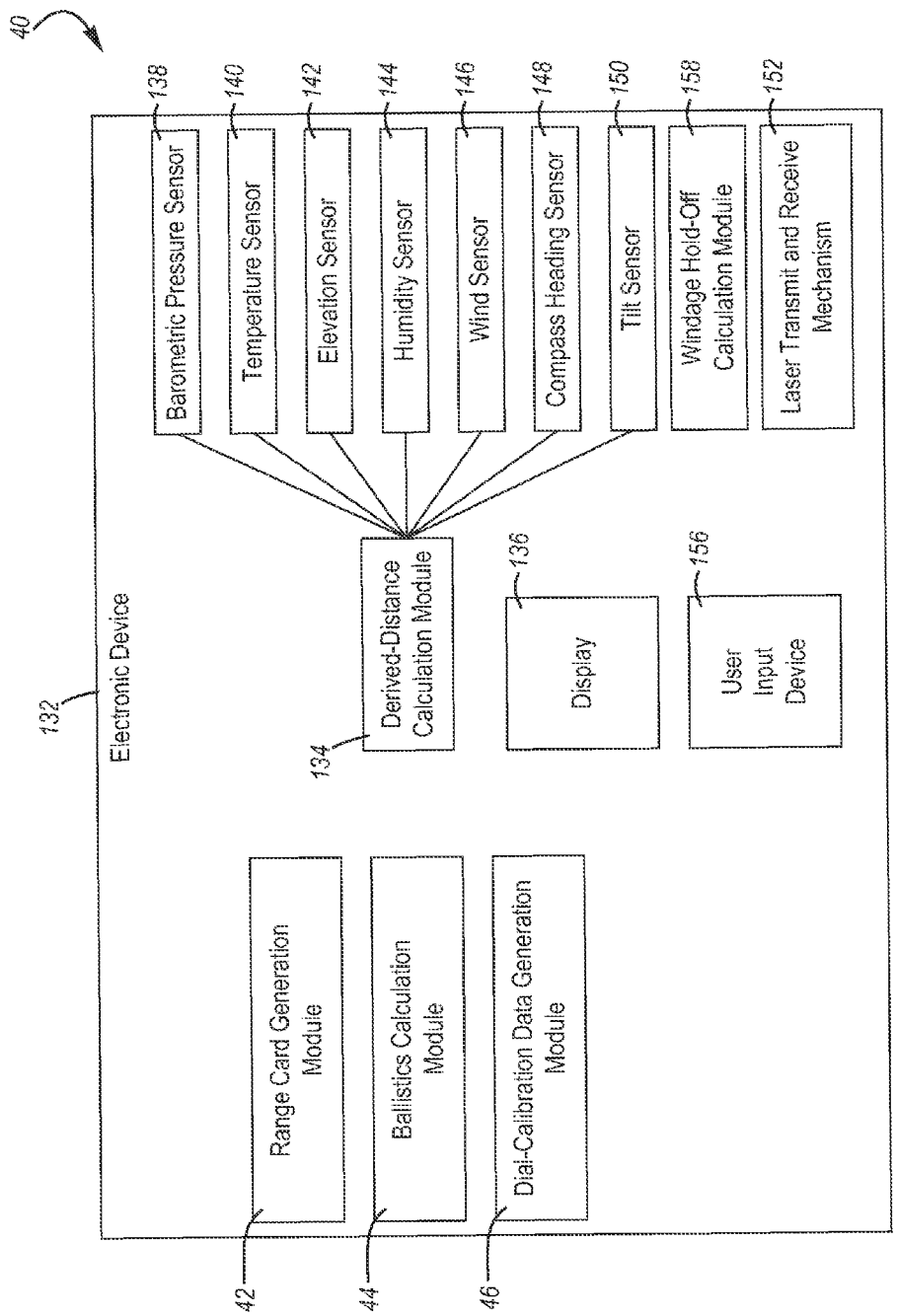
FIG. 17 is a block diagram illustrating an exemplary configuration of an electronic device.

In some embodiments, the derived-distance calculation module 134 may receive the dial-calibration data 18, the expected shooting conditions data, the sight-height data, the dial specification data, the ballistics coefficient data and/or the muzzle velocity data from the computing device 124 (FIGS. 8 and 15) or the electronic device 126 (FIGS. 10 and 16). In particular, the electronic device 132 may include an interface 154, such as a USB port, FireWire® port or other interface, via which the computing device 124 or the electronic device 126 may send such data to the derived-distance calculation module 134 of the electronic device 132. The interface 154, however, is not required and some or all of the features of the electronic device 120 may be integrated into the electronic device 132, as shown in FIG. 17. It will be appreciated that the electronic device 132 may receive the dial-calibration data 18, the expected shooting conditions data, the sight-height data, the dial specification data, the ballistics coefficient data, the muzzle velocity data, the actual shooting conditions data and/or other data via sensors, user input (using, for instance, one or more user input devices 156) or any other suitable means.

As shown in FIGS. 15-17, the electronic device 132 may include a windage hold-off calculation module 158, which may be configured to calculate a hold-off to compensate for an amount of deflection caused by a crosswind. An exemplary hold-off may include a number of hash marks, dots or other such features of a reticle; a minutes-of-angle ("MOA") adjustment; and/or any other suitable hold-off.

To calculate the hold-off, the windage hold-off calculation module 158 may use the distance to a target, the dial-calibration data 18, the expected shooting conditions data, the sight-height data, the dial specification data, the ballistics coefficient data, the muzzle velocity data, the actual shooting conditions data and/or other data that the derived-distance calculation module 134 may or may not use to calculate the derived distance. In some embodiments, the windage hold-off calculation module 158 may receive this data in a variety of ways including, but not limited to, the ways discussed above that the derived-distance calculation module 134 may receive this data.

The display 136 of the electronic device 132 may advantageously display the hold-off to a shooter who may quickly and easily apply the hold-off. If desired, the display 136 of the electronic device 132 may advantageously be configured to display the hold-off, the derived distance, or both.

As shown above, the methods and systems described above can be implemented using one or more modules, which may include, for example, software and/or hardware. The software and/or hardware may include web services, object-oriented software components, class components, task components, processes, functions, attributes, procedures, subroutines, segments of program code, drivers, firmware, microcode, circuitry, data, databases, data structures, tables, arrays, variables, field programmable gate arrays (FPGAs), application-specific integrated circuits (ASICs), processors, computing devices, firmware, other software components and/or other hardware components. If desired, the functionality provided for in the modules discussed above may be combined into fewer modules or further separated into additional modules, if desired.

Although this invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. A system comprising:
a scope sized and configured to be connected to a gun, the scope including an adjustment dial sized and configured to move among a plurality of positions to configure the scope to compensate for projectile drops associated with a range of distances to a target, the adjustment dial comprising:
a first set of dial-calibration data comprising at least one distance indicator to indicate a distance from the gun to the target; and
a second set of dial-calibration data comprising at least one windage hold-off indicator to indicate a hold-off for a given distance;
wherein the windage hold-off indicators indicate the hold-off when the adjustment dial is adjusted according to the distance between the gun and the target;
wherein the adjustment dial includes a turret with the first set of dial-calibration data and the second set of dial-calibration data, the turret sized and configured to be connected to and disconnected from a portion of the scope; and
a second turret sized and configured to be connected to and disconnected from a portion of the scope, the first and second turrets sized and configured to be interchangeably used with the scope, the second turret-comprising:
a first set of dial-calibration data comprising at least one distance indicator to indicate a distance from the gun to the target; and
a second set of dial-calibration data comprising at least one windage hold-off indicator to indicate a hold-off for a given distance;
wherein the windage hold-off indicators indicate the hold-off when the adjustment dial is adjusted according to the distance between the gun and the target.

2. The system in claim 1, wherein the at least one windage hold-off indicator is at least partially generated using a first set of one or more shooting conditions.

3. The system in claim 1, further comprising a gun connected to the scope, the at least one windage hold-off indicator being at least partially generated using ballistics performance data based on one or more shots fired by the gun.

4. The system in claim 1, wherein the at least one distance indicator is at least partially generated using a first set of one or more shooting conditions.

5. The system in claim 1, further comprising a gun connected to the scope, the at least one distance indicator being at least partially generated using ballistics performance data based on one or more shots fired by the gun.

6. The system in claim 1, wherein the at least one windage hold-off indicator of the first turret is at least partially generated using a first set of one or more shooting conditions; and
   wherein the at least one windage hold-off indicator of the second turret is at least partially generated using a second, different set of one or more shooting conditions.

7. The system in claim 1, further comprising a gun connected to the scope, the at least one windage hold-off indicator of the first turret being at least partially generated using ballistics performance data based on a first set of one or more shots fired by the gun, the at least one windage hold-off indicator of the second turret being at least partially generated using ballistics performance data based on a second set of one or more shots fired by the gun.

8. The system in claim 7, wherein the at least one distance indicator of the first turret is at least partially generated using the set of one or more shooting conditions; and
   wherein the at least one distance indicator of the second turret is at least partially generated using the second, different set of one or more shooting conditions.

9. The system in claim 1, wherein the at least one distance indicator of the first turret is at least partially generated using a first set of one or more shooting conditions; and
   wherein the at least one distance indicator of the second turret is at least partially generated using a second, different set of one or more shooting conditions.

10. The system in claim 1, further comprising a gun connected to the scope, the at least one distance indicator of the first turret being at least partially generated using ballistics performance data based on a first set of one or more shots fired by the gun, the at least one distance indicator of the second turret being at least partially generated using ballistics performance data based on a second set of one or more shots fired by the gun.

11. The system in claim 10, wherein the at least one distance indicator of the first turret is at least partially generated using the set of one or more shooting conditions; and
   wherein the at least one distance indicator of the second turret is at least partially generated using the second, different set of one or more shooting conditions.

12. The system in claim 1, further comprising an electronic device including a derived distance calculation module, the first set of dial-calibration data being at least partially generated using a set of one or more shooting conditions, the derived distance calculation module being configured to use a distance to a target and a different set of one or more shooting conditions to calculate a derived distance that may be selected using the adjustment dial to configure the scope to compensate for a projectile drop associated with the different set of one or more shooting conditions.

13. An apparatus comprising:
   an electronic device including a derived distance calculation module configured to use a distance to a target and a set of one or more actual shooting conditions to calculate a derived distance, the derived distance being configured to be selected using an adjustment dial of a scope to configure the scope to compensate for a projectile drop associated with the set of one or more actual shooting conditions, the adjustment dial being labeled with dial-calibration data at least partially generated using a set of one or more expected shooting conditions, the set of one or more expected shooting conditions being different from the set of one or more actual shooting conditions.

14. The apparatus as in claim 13, wherein the dial-calibration data comprises at least one distance indicator configured to indicate at least one distance, the at least one distance indicator being at least partially generated using the set of one or more expected shooting conditions.

15. The apparatus as in claim 13, wherein the dial-calibration data comprises at least one windage hold-off indicator configured to indicate at least one hold-off for at least one distance, the at least one windage hold-off indicator being at least partially generated using the set of one or more expected shooting conditions.

16. The apparatus as in claim 13, wherein the electronic device further includes a windage hold-off calculation module configured to calculate a hold-off to compensate for an amount of deflection caused by a crosswind.

17. A method comprising:
   using a distance to a target and a set of one or more actual shooting conditions to calculate a derived distance, the derived distance being configured to be selected using an adjustment dial of a scope to configure the scope to compensate for a projectile drop associated with the set of one or more actual shooting conditions, the adjustment dial being labeled with dial-calibration data at least partially generated using a set of one or more expected shooting conditions, the set of one or more expected shooting conditions being different from the set of one or more actual shooting conditions.

18. The method as in claim 17, wherein the dial-calibration data comprises at least one distance indicator configured to indicate at least one distance, the at least one distance indicator being at least partially generated using the set of one or more expected shooting conditions.

19. The method as in claim 17, wherein the dial-calibration data comprises at least one windage hold-off indicator configured to indicate at least one hold-off for at least one distance, the at least one windage hold-off indicator being at least partially generated using the set of one or more expected shooting conditions.

* * * * *

UNITED STATES PATENT AND TRADEMARK OFFICE
CERTIFICATE OF CORRECTION

PATENT NO.       : 8,001,714 B2
APPLICATION NO.  : 11/838183
DATED            : August 23, 2011
INVENTOR(S)      : Davidson It is certified that error appears in the above-identified patent and that said Letters Patent is hereby corrected as shown below:

1. On the Title Pg, Item (74), under "Attorney, Agent, or Firm", Line 2, delete "Israelson" and insert -- Israelsen --, therefor.

2. In Column 5, Line 37, delete "1/2 MOA" and insert -- 11/2 MOA --, therefor.

3. In Column 5, Line 48, delete "1/2 MOA and 1/4 MOA" and insert -- 11/2 MOA and 13/4 MOA --, therefor.

Signed and Sealed this
Seventeenth Day of April, 2012

David J. Kappos
*Director of the United States Patent and Trademark Office*